(12) United States Patent
Cox et al.

(10) Patent No.: US 8,047,569 B2
(45) Date of Patent: Nov. 1, 2011

(54) MULTI-STAGE INFLATOR

(75) Inventors: Matthew A. Cox, Centerville, UT (US); Michael P. Jordan, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/723,331

(22) Filed: Mar. 12, 2010

(65) Prior Publication Data

US 2011/0221173 A1    Sep. 15, 2011

(51) Int. Cl.
*B60R 21/26*    (2006.01)
(52) U.S. Cl. .................................................... 280/736
(58) Field of Classification Search .................. 280/737, 280/736, 740, 741
See application file for complete search history.

(56) References Cited

U.S. PATENT DOCUMENTS

| | | | |
|---|---|---|---|
| 3,966,224 A | 6/1976 | Campbell et al. | |
| 5,016,914 A * | 5/1991 | Faigle et al. | 280/741 |
| 5,516,144 A * | 5/1996 | Headley et al. | 280/730.2 |
| 5,613,702 A | 3/1997 | Goetz | |
| 5,685,558 A | 11/1997 | Cuevas | |
| 5,880,534 A | 3/1999 | Mossi et al. | |
| 5,938,235 A | 8/1999 | Butt | |
| 5,992,881 A * | 11/1999 | Faigle | 280/737 |
| 6,032,979 A | 3/2000 | Mossi et al. | |
| 6,142,515 A | 11/2000 | Mika | |
| 6,168,200 B1 | 1/2001 | Greist, III et al. | |
| 6,189,924 B1 | 2/2001 | Hock | |
| 6,199,905 B1 * | 3/2001 | Lewis | 280/737 |
| 6,199,906 B1 | 3/2001 | Trevillyan et al. | |
| 6,206,414 B1 * | 3/2001 | Cook et al. | 280/734 |
| 6,224,097 B1 * | 5/2001 | Lewis | 280/737 |
| 6,364,353 B2 | 4/2002 | Green, Jr. et al. | |
| 6,474,684 B1 | 11/2002 | Ludwig et al. | |
| 6,491,321 B1 | 12/2002 | Nakashima et al. | |
| 6,547,275 B2 | 4/2003 | Nakashima et al. | |
| 6,557,888 B1 | 5/2003 | Nakashima et al. | |
| 6,659,500 B2 | 12/2003 | Whang et al. | |
| 6,669,230 B1 | 12/2003 | Nakashima et al. | |
| 6,722,694 B1 | 4/2004 | Nakashima et al. | |
| 6,739,621 B2 | 5/2004 | Parkinson et al. | |
| 6,763,764 B2 | 7/2004 | Avertsian et al. | |
| 6,848,713 B2 | 2/2005 | Nakashima et al. | |

(Continued)

OTHER PUBLICATIONS

Concurrently-filed U.S. Patent Application, Matthew A. Cox et al., filed Mar. 12, 2010, "Additives for Liquid-Cooled Inflators".

*Primary Examiner* — Faye M. Fleming
(74) *Attorney, Agent, or Firm* — Sally J. Brown; Pauley Petersen & Erickson (57) ABSTRACT

A multi-stage inflator including a housing at least in part defining first and second combustion chambers each containing a quantity of gas generant reactable to form respective product gases. The inflator includes first and second initiators each operatively associated with a respective one of the combustion chambers in reaction initiating communication with at least a portion of the quantity of the gas generant therein contained such that upon actuation the gas generant ignites to form product gas. The second combustion chamber has an exit opening to allow product gas to exit from the second combustion chamber and into the first combustion chamber. The housing includes at least one discharge opening to permit gas to exit the housing and an end wall and wherein both the first and the second initiators are connected.

19 Claims, 2 Drawing Sheets

U.S. PATENT DOCUMENTS

| | | |
|---|---|---|
| 6,851,709 B2 | 2/2005 | Ogawa et al. |
| 6,860,510 B2 | 3/2005 | Ogawa et al. |
| 6,874,814 B2 * | 4/2005 | Hosey et al. .................. 280/737 |
| 6,886,855 B2 | 5/2005 | Cheal et al. |
| 6,918,611 B1 | 7/2005 | Winters et al. |
| 6,966,578 B2 | 11/2005 | Smith |
| 7,044,502 B2 | 5/2006 | Trevillyan et al. |
| 7,104,569 B2 | 9/2006 | Goetz |
| 2002/0005636 A1 | 1/2002 | McFarland et al. |
| 2002/0050703 A1 | 5/2002 | Whang et al. |
| 2002/0101068 A1 | 8/2002 | Quioc |
| 2002/0144621 A1 | 10/2002 | McFarland et al. |
| 2002/0167155 A1 | 11/2002 | Nakashima et al. |
| 2003/0070574 A1 | 4/2003 | Rink et al. |
| 2003/0121578 A1 | 7/2003 | Parkinson et al. |
| 2003/0127840 A1 | 7/2003 | Nakashima et al. |
| 2003/0146611 A1 | 8/2003 | Kenney et al. |
| 2003/0160437 A1 | 8/2003 | Ohji et al. |
| 2003/0184068 A1 | 10/2003 | Nakashima et al. |
| 2003/0234526 A1 | 12/2003 | Quioc |
| 2004/0046373 A1 | 3/2004 | Wang et al. |
| 2004/0061319 A1 | 4/2004 | Saso et al. |
| 2004/0163565 A1 | 8/2004 | Gabler et al. |
| 2004/0195813 A1 | 10/2004 | Canterberry et al. |
| 2005/0035579 A1 | 2/2005 | Canterberry et al. |
| 2005/0184498 A1 | 8/2005 | Trevillyan et al. |
| 2006/0267322 A1 | 11/2006 | Eckelberg |
| 2007/0090635 A1 | 4/2007 | Okamoto et al. |
| 2008/0136152 A1 | 6/2008 | McFarland |
| 2008/0211215 A1 | 9/2008 | Hoffman et al. |
| 2008/0257195 A1 | 10/2008 | Nakayasu et al. |
| 2009/0288574 A1 | 11/2009 | Jackson et al. |
| 2010/0013201 A1 | 1/2010 | Cox et al. |

* cited by examiner

FIG. 1

FIG. 2

MULTI-STAGE INFLATOR

BACKGROUND OF THE INVENTION

This invention relates generally to inflators for use in inflating inflatable restraint airbag cushions, such as used to provide impact protection to occupants of motor vehicles. More particularly, the invention relates to inflator devices having multiple or plural stages or levels of inflation gas output and as such may be used to provide an inflation gas output which is adaptive to factors such as one or more crash and occupant conditions.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion. One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Pyrotechnic inflators typically may have one or more chambers containing gas generant. Adaptive pyrotechnic inflators having gas generant material in two chambers, for which reaction is each independently initiated by a specified initiator, have been referred to as "dual stage" inflators.

In practice, each such gas generant material-containing chamber is oftentimes referred to as a "combustion chamber" as the gas generant material therein contained is burned or otherwise reacted to produce or form gas such as may be used to inflate an associated inflatable restraint airbag cushion. The initiators are typically electrically-actuated. As a result, dual stage tubular passenger inflators are commonly configured with one initiator electrical connection on each of two opposite ends of a tubular-shaped inflator body. Such an inflator construction necessitates an inflatable restraint system airbag module that allows access to both ends of the tubular inflator so that appropriate required electrical connections can be made thereto.

Dual stage inflators may have several contemplated firing scenarios. In a first such scenario, only the gas generant material in a first or primary chamber is actuated whereby a fixed quantity of inflation gas is produced thereby. In a second possible firing scenario, the first or primary chamber is first actuated whereby gas generant material in the first chamber is first reacted to start to produce or form inflation gas and after a predetermined or preselected delay, the gas generant material in a second or secondary chamber is then actuated whereby gas generant material in the second chamber is reacted to also produce or form inflation gas. In a third possible firing scenario, the gas generant material in the first chamber and the gas generant material in the second chamber are actuated simultaneously to produce or form inflation gas from the gas generant material in each of the chambers.

As will be appreciated, through the selection and use of an appropriate such firing scenario, inflator output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Multi-stage and adaptive inflator devices find widespread use in modern day vehicle occupant safety restraint systems. Such use leads to a need and desire for improved such inflator devices such as capable of specifically varying selected inflation performance scenarios. Thus, there is a need and demand for such inflator devices and associated methods of operation of increased simplicity and reliability of operation and design. In particular, there is a need and demand for such inflator devices and associated methods of operation that provide or result in specifically desired inflation performance scenarios in a less costly and/or more efficient manner.

SUMMARY OF THE INVENTION

The present invention provides an improved inflator device and associated or corresponding methods of operation.

As described in greater detail below, there is provided a multi-stage inflator that includes a housing and first and second initiators.

In a first aspect, the housing generally at least in part defines a first combustion chamber containing a quantity of a first gas generant reactable to form a first product gas. The first combustion chamber has or includes at least one exit opening to allow at least a portion of the first product gas to exit the first combustion chamber. The first initiator is operatively associated with the first combustion chamber in reaction initiating communication with at least a portion of the quantity of the first gas generant. Upon actuation, the first initiator acts to ignite the first gas generant to form the first product gas. The housing additionally at least in part defines a second combustion chamber containing a quantity of a second gas generant reactable to form a second product gas. The second combustion chamber is generally adjacently disposed to the first combustion chamber. The second combustion chamber has or includes at least one exit opening to allow at least a portion of the second product gas to exit from the second combustion chamber and into the first combustion chamber. The second initiator is operatively associated with the second combustion chamber in reaction initiating communication with at least a portion of the quantity of the second gas generant. Upon actuation, the second initiator acts to ignite the second gas generant to form the second product gas. The housing additionally has or includes at least one discharge opening to permit gas to exit the housing as well as an end wall and wherein both the first and the second initiators are connected.

In another aspect, there is provided a tubular multi-stage inflator. The tubular multi-stage inflator includes a tubular housing having an elongated form. The tubular housing at least in part defines a first combustion chamber that contains a quantity of a first gas generant reactable to form a first product gas. The first combustion chamber has or includes at least one exit opening to allow at least a portion of the first product gas to exit the first combustion chamber.

A first initiator is operatively associated with the first combustion chamber in reaction initiating communication with at least a portion of the quantity of the first gas generant. The first initiator, upon actuation, acts or serves to ignite the first gas generant to form the first product gas.

The tubular housing additionally at least in part defines a second combustion chamber that contains a quantity of a second gas generant reactable to form a second product gas. The second combustion chamber is generally adjacently disposed to the first combustion chamber. The second combustion chamber has or includes at least one exit opening to allow at least a portion of the second product gas to exit from the second combustion chamber and into the first combustion chamber.

A second initiator is operatively associated with the second combustion chamber in reaction initiating communication with at least a portion of the quantity of the second gas generant. The second initiator, upon actuation, acts or serves to ignite the second gas generant to form the second product gas.

The tubular housing includes at least one discharge opening to permit gas to exit the housing. The tubular housing further includes an end wall with both the first and the second initiators connected to the end wall.

In another aspect, there is provided a method of operation for a multi-stage inflator that includes a tubular housing and first and second initiators. More particularly, the tubular housing has an elongated form and at least in part defines a first combustion chamber containing a quantity of a first gas generant reactable to form a first product gas. The first combustion chamber has at least one exit opening to allow at least a portion of the first product gas to exit the first combustion chamber. The tubular housing also at least in part defines a second combustion chamber containing a quantity of a second gas generant reactable to form a second product gas. The second combustion chamber is adjacently disposed the first combustion chamber and has at least one exit opening to allow at least a portion of the second product gas to exit from the second combustion chamber and into the first combustion chamber. The first initiator is operatively associated with the first combustion chamber in reaction initiating communication with at least a portion of the quantity of the first gas generant. Upon actuation, the first initiator serves to ignite the first gas generant to form the first product gas. The second initiator is operatively associated with the second combustion chamber in reaction initiating communication with at least a portion of the quantity of the second gas generant. Upon actuation, the second initiator serves to ignite the second gas generant to form the second product gas. The tubular housing additionally has at least one discharge opening to permit gas to exit the housing. The tubular housing also includes an end wall with both the first and the second initiators connected to the end wall. In accordance with one such method of operation, the first initiator is actuated to ignite the first gas generant material and to form the first product gas. At least a portion of the first product gas is subsequently released through the at least one discharge opening.

As used herein, references to "dual stage inflator devices" are to be understood to refer to adaptive pyrotechnic inflators having gas generating material in two chambers which are independently ignited by two igniters.

References to the detection or sensing of "occupant presence" are to be understood to refer to and include detection and sensing of one or more of the size, weight, and/or position of a particular vehicle occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

DETAILED DESCRIPTION OF THE INVENTION

Figure 1:
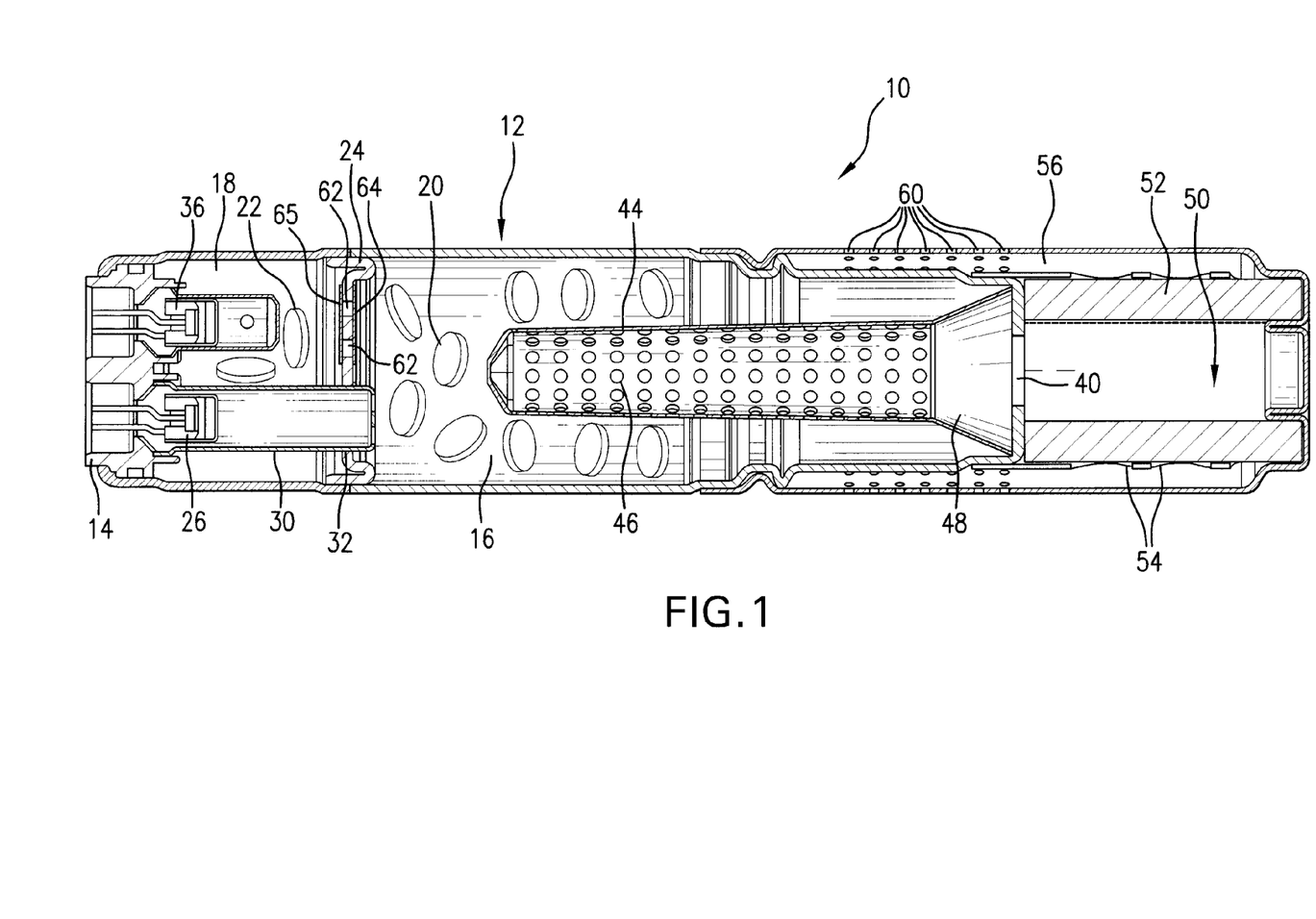
FIG. 1 is a simplified sectional view of an embodiment of an inflator in accordance with one aspect of the invention.

FIG. 1 illustrates an adaptive output inflator, generally designated with the reference numeral 10, and in accordance with a one embodiment of the invention. While the invention will be described hereinafter with particular reference to a passenger side airbag inflatable restraint system installation, it will be understood that the invention has general applicability to other types or kinds of airbag assemblies including, for example, driver side airbag assemblies such as for automotive vehicles including vans, pick-up trucks, and particularly automobiles.

The inflator 10 has a generally cylindrical external outline and includes a generally cylindrical housing 12, such as having a tubular elongated form, and, as discussed in greater detail below, at least one end wall 14. The housing 12 may desirably be formed or made of metal or steel or other materials as may be desired for particular applications. The housing can be of a one-piece or multi-piece construction, as may be desired.

The housing 12 at least in part defines both a first combustion chamber 16 and a second combustion chamber 18. The first combustion chamber 16 contains a quantity of a first gas generant 20 reactable to form a first product gas. The second combustion chamber 18 contains a quantity of a second gas generant 22 reactable to form a second product gas.

In the illustrated embodiment, the first and second combustion chambers, 16 and 18, are separated by a bulkhead element 24. As will be appreciated, the broader practice of the invention is not necessarily to constructions utilizing such a bulkhead element for the separation of such first and second combustion chambers. Those skilled in the art and guided by the teachings herein provided will appreciate that desired separation of first and second combustion chambers can be effected by other suitable means or techniques such as may be employed in the practice of the invention.

The inflator 10 also includes a first initiator 26 operatively associated with the first combustion chamber 16 in reaction initiating communication with at least a portion of the quantity of the first gas generant 20. To that end, an igniter tube 30 extends between the first initiator 26, through an opening 32 in the bulkhead 24 and to the first combustion chamber 16 such as to span the length of the second combustion chamber 18. The first initiator 26, upon actuation, serves or acts to ignite the first gas generant 20 to form a first product gas.

The inflator 10 also includes a second initiator 36 operatively associated with the second combustion chamber 18 in reaction initiating communication with at least a portion of the quantity of the second gas generant 22. The second initiator 36, upon actuation, serves or acts to ignite the second gas generant 22 to form a second product gas.

In accordance with one preferred embodiment, the first initiator 26 and the second initiator 36 are both connected to the end wall 14. As will be appreciated by those skilled in the art and guided by the teachings herein provided, by placement or positioning of such required electrical connections at or on a single end of the inflator, an inflator in accordance with the invention and such as represented by the inflator 10 can facilitate the incorporation of the inflator in various vehicle locations and structures.

The first combustion chamber 16 includes at least one exit opening 40 such as may normally be sealed by a burst foil or other suitable closure (not shown). The first combustion chamber 16 may desirably have a constant volume. That is, before, during, and after deployment of the inflator 10, the volume of the first combustion chamber 16 may desirably remain the same.

The inflator 10 may further include one or more baffles 44 positioned in the first combustion chamber 16. The baffle 44 is shown as having a generally elongated form to generally corresponding to the elongated form of the first combustion chamber 16. The baffle 44 desirably includes an array of openings 46 such as serve to permit combustion gas products to pass therethrough while desirably minimizing or avoiding passage of particulates with such gas products. For example, the baffle 44 includes a skirt portion 48 of increased circumference and having a generally frustoconical shape or form that is free of openings.

As will be appreciated by those skilled in the art and guided by the teaching herein provided, baffles of other configurations and/or shapes are possible and can be used, if desired. Further, such baffles may include such openings in various suitable arrangements.

The inflator 10 further includes a chamber 50 externally adjacent the exit opening 40 of the first combustion chamber 16. The chamber 50 houses or contains one or more filter or inflation gas treatment components 52, such as known in the art and such as may desirably perform one or more functions or operations on a contacting stream, e.g., the generated or produced inflation gas, such as the cooling, flow redirection or filtering, e.g., particulate removal, of or from the contacting stream. In view thereof, the chamber 50 is sometimes referred to as a "filter chamber".

The filter chamber 50 includes a plurality of exit ports 54 wherethrough gas, having passed through the treatment component 52, passes into a diffuser chamber 56 and such as includes gas flow openings 60 in the housing 12 such that gas may flow out of inflator 10 so that it may be channeled into an associated airbag (not shown). The gas flow openings 60 may or may not be sealed by one or more burst disks, foil elements or the like prior to deployment.

The bulkhead 24 additionally includes one or more gas flow openings 62 such as to permit gas flow passage between the second combustion chamber 18 and the first combustion chamber 16. The bulkhead gas flow openings 62 are normally closed by an isolation disk, a burst disk or the like, generally designated by the reference numeral 64 such as located within the first combustion chamber 16. For example, an adhesive-backed metal foil can be used for such an application.

The bulkhead 24 may also contain, include or have a second isolation disk, burst disk or the like, generally designated by the reference numeral 65, such as located within the second combustion chamber 18. Such a second isolation disk may be included to desirably provide pressure retention in the second combustion chamber until a designated pressure is reached or achieved within the second combustion chamber and at which pressure the isolation disk 65 bursts to allow flow of the second combustion chamber product gas into the first combustion chamber 16.

When activated, the first initiator 26 produces ignition products such as including hot gas that communicates via the igniter tube 30 with the interior of the first combustion chamber 16 such that at least a portion of the ignition products contact and ignite at least a portion of the quantity of the first gas generant 20 contained within the first combustion chamber 16. In turn, the ignition of the first gas generant 20 creates a supply of gas that passes through the openings 46 to the interior of the baffle 44. When the pressure within the first combustion chamber 16 is sufficiently elevated, the burst foil normally closing the exit opening 40 ruptures and allows the gas to exit the chamber 16 therethrough.

The gas subsequently passes into the filter chamber 50 and through the treatment component 52 and into the diffuser chamber 56. The gas flows out of the inflator 10 via the gas flow openings 60 in the housing 12 such that gas may be appropriately channeled into an associated airbag (not shown) to deploy the airbag. Those skilled in the art and guided by the teachings herein provided will appreciate that initiators and gas generants are known in the art and that a variety of different features may be used for these components.

When properly actuated, the second initiator 36 can discharge or otherwise result in the ignition and reaction of the second gas generant 22 contained or housed within the second combustion chamber 18 and in the production of gaseous inflation products. With sufficient production of gaseous inflation products within the second combustion chamber 18, the pressure within the second combustion chamber 18 and acting against the burst disk 65 increases. When the pressure from within the second combustion chamber 18 against the burst disk 65 becomes sufficiently large, the burst disk 65 ruptures or otherwise allows the gas to exit the second combustion chamber 18 through the bulkhead gas flow openings 62. The rupture of the burst disk 65 allows pressure from the second combustion chamber 18 to act on the burst disk 64 and rupture or otherwise move the burst disk away from the openings 62. Thus gas flow communication is permitted from the second combustion chamber 18 into the first combustion chamber 16. In particular, the gas products formed in the second combustion chamber 18 and passed into the first combustion chamber 16 can supplement the gas products formed in the first combustion chamber and can subsequently be appropriately desirably passed through the gas exit flow openings 60 and out from the inflator assembly 10 into an associated airbag cushion (not shown).

As will be appreciated, the inflator assembly 10 described above does not include gas exit openings or ports in the portion of the inflator housing 12 defining or forming the second combustion chamber 18. Rather, gas produced or formed within the second combustion chamber 18 is directed through the bulkhead gas flow openings 62 and subsequently through the gas exit flow openings 60 and out from the inflator assembly 10 into an associated airbag cushion.

It will be appreciated that an inflator assembly in accordance with the invention can provide operation performance in accordance with selected operating conditions as may be required or desired for particular inflatable restraint system installations and applications. More specifically, an inflator assembly of the invention can be actuated in a manner such that either or both the quantity or rate of inflation gas production can be appropriately varied, such as at the time of a vehicle crash or collision incident, to take into account one or more conditions of occupant presence, as described above. Such inflator performance adaptability results from the subject inflator having two discrete and ballistically isolated chambers of gas generant materials. The subject inflator permits several distinct inflation performance scenarios:

For example, such an inflator assembly can be operated to have a first stage discharge whereby the first initiator 26 is actuated to ignite the first gas generant 20, such as described above, to produce inflation gas at a first output level without actuating or firing the second initiator 36 or reacting or activating the gas generant 22 contained in the second combustion chamber 18. As will be appreciated, such operation may be desired to provide a minimized or reduced inflator output such as may be desired in an instance of a low speed collision, for example.

Alternatively, an inflator assembly in accordance with the invention can be operated such that both the first and second initiators, 26 and 36, respectively, are actuated.

As will be appreciated, such operation and ignition of both the first and second initiators and first and second gas generant materials can involve the simultaneous or near simultaneous actuation and firing of the first and second initiators (such as may be desired in order to provide a very rapid inflation and deployment of an associated airbag cushion, as may be desired in response to a high speed or severe vehicle collision) or the sequential actuation and firing of the first and second initiators (such as may be desired upon the occurrence of a moderately severe vehicle collision). Further, with such sequential actuation and firing, the time lag or delay between the actuation and firing of the first and second initiators squibs and, in turn, the ignition of the first and second gas generant can be tailored to meet the specific requirements for a particular inflatable restraint system installation, as will be appreciated by those skilled in the art. Thus, such inflator assemblies are particularly suited for application as adaptive output inflators such as can be made generally dependent on one or more selected operating conditions such as ambient temperature, occupant presence, seat belt usage and rate of deceleration of the motor vehicle, for example.

Figure 2:
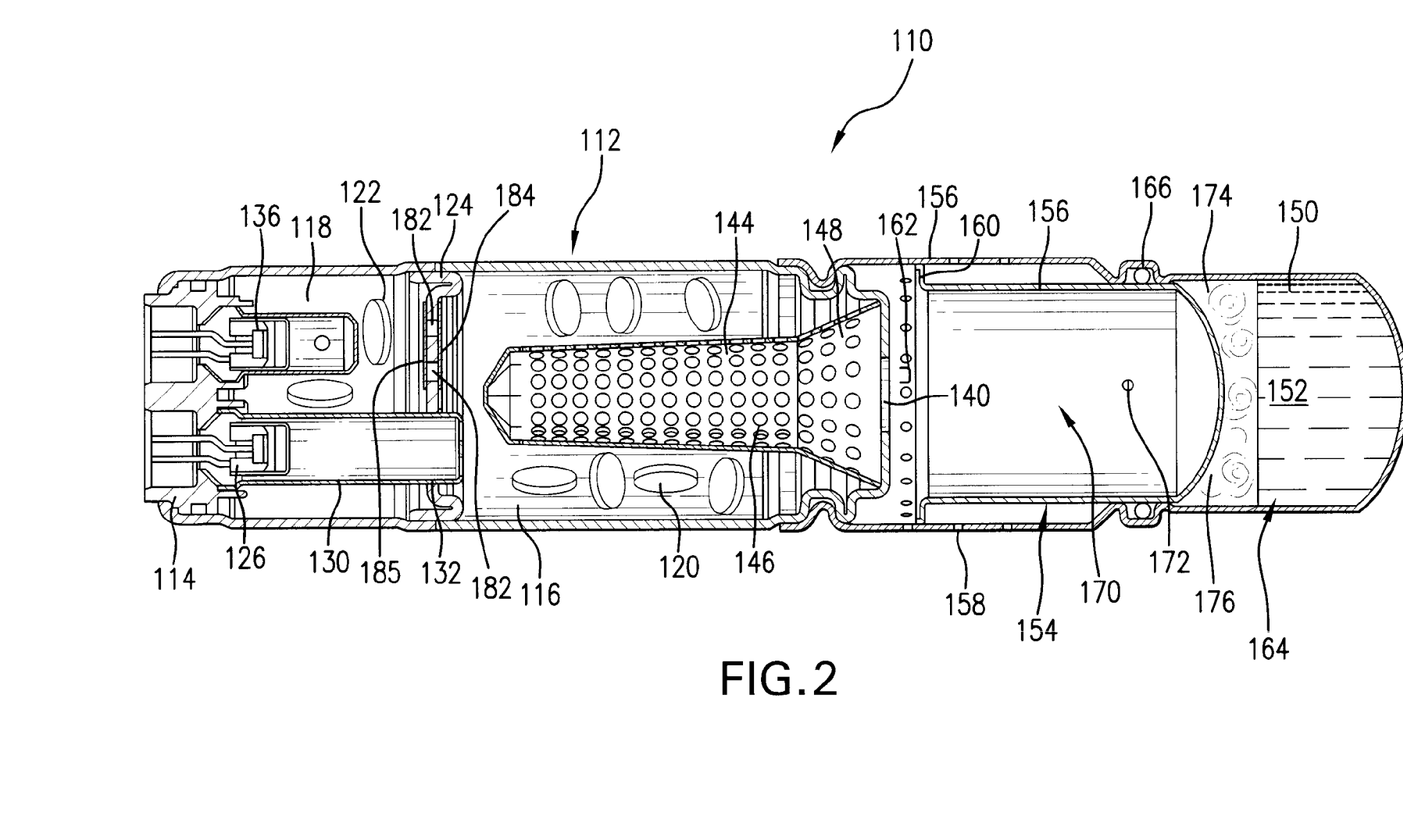
FIG. 2 is a simplified sectional view of another embodiment of an inflator in accordance with one aspect of the invention.

Turning now to FIG. 2, there is illustrated an adaptive output inflator, generally designated with the reference numeral 110, in accordance with another embodiment of the invention.

The inflator 110 is in various respects similar to the inflator 10 shown in FIG. 1 and described above. For example, the inflator 110, similar to the inflator 10, includes a generally cylindrical housing 112, such as having a tubular elongated form, and at least one end wall 114. The housing 112 at least in part defines both a first combustion chamber 116 and a second combustion chamber 118. The first combustion chamber 116 contains a quantity of a first gas generant 120 reactable to form a first product gas. The second combustion chamber 118 contains a quantity of a second gas generant 122 reactable to form a second product gas. The first and second combustion chambers, 116 and 118, are separated by a bulkhead element 124.

The inflator 110 also includes a first initiator 126 operatively associated with the first combustion chamber 116 in reaction initiating communication with at least a portion of the quantity of the first gas generant 120. To that end, an igniter tube 130 extends between the first initiator 126, through an opening 132 in the bulkhead 124 and to the first combustion chamber 116 such as to span the length of the second combustion chamber 118. The first initiator 126, upon actuation, serves or acts to ignite the first gas generant 120 to form a first product gas.

The inflator 110 also includes a second initiator 136 operatively associated with the second combustion chamber 118 in reaction initiating communication with at least a portion of the quantity of the second gas generant 122. The second initiator 136, upon actuation, serves or acts to ignite the second gas generant 122 to form a second product gas.

In accordance with one preferred embodiment, the first initiator 126 and the second initiator 136 are both connected to the end wall 114.

The first combustion chamber 116 includes at least one exit opening 140 such as may normally be sealed by a burst foil or other suitable closure (not shown). The first combustion chamber 116 may desirably have a constant volume. That is, before, during, and after deployment of the inflator 110, the volume of the first combustion chamber 116 may desirably remain the same.

The inflator 110 may further include one or more baffles 144 positioned in the first combustion chamber 116. The baffle 144 is shown as having a generally elongated form to generally corresponding to the elongated form of the first combustion chamber 116. The baffle 144 desirably includes an array of openings 146 such as serve to permit combustion gas products to pass therethrough. In this embodiment, the baffle 144 includes a skirt portion 148 of increased circumference and having a generally frustoconical shape or form that additionally includes openings 146.

A significant difference between the inflator 110 and the inflator 10 is that the inflator 110 is liquid cooled. To that end, the housing 112 additionally defines a chamber 150 adjacently disposed the first combustion chamber 116 opposite the second combustion chamber 118. The chamber 150, sometimes referred to herein as a "storage chamber," contains a quantity of liquid 152 and a piston assembly 154. The piston assembly 154 including a piston 156 having an interior sealed from the quantity of liquid, wherein during deployment, the piston 156 moves to unseal the interior of the piston from the liquid to expel at least a portion of the quantity of liquid from the storage chamber such that the expelled liquid contacts and cools at least the first product gas.

The inflator 110 also includes gas flow openings 158 in the housing 112. As will be explained herein, when the inflator 110 is deployed, gas may flow out of the gas flow openings 158 so that it may be channeled into the airbag (not shown). The gas flow openings 158 may or may not be sealed by one or more burst disks, foil elements or the like prior to deployment.

The piston 156 includes a base flange 160. In the illustrated embodiment, the piston 156 of the inflator 110 is desirably held in place until deployment by means of tabs 162 such as formed from the outer housing 112 by piercing the outer housing and folding such piercing inward towards the interior of the housing and such as included at several locations (e.g., typically 4 to 6 locations) above (not shown) and below the piston base flange 160. As will be appreciated by those skilled in the art and guided by the teachings herein provided, if desired, suitable alternative elements or means to maintain the placement of the piston 156 within the housing 110 until deployment can be employed in the practice of the invention.

Adjacent the piston 156 is a chamber 164 that includes or contains liquid 152. In this embodiment, the liquid 152 is sealed within the chamber 164 via the inclusion of an O-ring seal 166. As will be appreciated by those skilled in the art and guided by the teachings herein provided, if desired, various suitable alternative elements or means can be employed in the practice of the invention to seal the liquid 152 within the chamber 164.

The interior of the piston 156 is or forms a mixing chamber 170. When gas produced by the combustion of the first and/or second gas generants, 20 and 22, respectively, exits the first combustion chamber 116, it may impact the piston 156 and fill the mixing chamber 170. As the piston 156 advances into chamber 164, the gas produced can exit the inflator via openings 158.

Once one or more of the piston openings 172 have been moved/displaced into the chamber 164, past the O-ring seal or other seal element 166, liquid 152 will begin to flow out of the chamber 164 through the openings 172 in the piston 156. The movement of the piston 156 acts or serves to hydraulically expel the liquid 152 in the chamber 164 thereby causing the liquid 152 to inject through the openings 172 for contact and mixing with the gas generant combustion product gas. The liquid 152 injected into the interior of the piston 156 can vaporize and be used to inflate the airbag. Moreover, the vaporization desirably operates to cool the gas generant combustion product gas. The gas generant combustion product gas and the liquid 152 may mix in the mixing chamber 170. It should be noted that, in some embodiments, the gas generant combustion product gas will push against the head of the piston 156 as a means of moving the piston 156. As the gas generant combustion product gas pushes against the piston head, particulates and other undesirable byproducts can be deposited onto the piston head and are thus separated from the quantity of gas generant combustion product gas.

Further, as noted above, the piston 156 may displace towards the chamber 164. In some embodiments, this movement of the piston 156 may be facilitated by not having the chamber 164 completely full with liquid 152. In other words, there is a space (sometimes called a "head space") within the chamber 164 into which the piston 152 may displace. In some embodiments, this head space 174 may be filled with a compressible gas 176 that allows the piston 156 to move into the chamber 164 during deployment. This compressible gas 176 may be air, argon, or any other suitable gas. This gas will escape out of the chamber 164 when it is unsealed and may further be used in the inflation process.

The bulkhead 124 additionally includes one or more gas flow openings 182 such as to permit gas flow passage between the second combustion chamber 118 and the first combustion chamber 116. The bulkhead gas flow openings 182 are normally closed by an isolation disk, a burst disk or the like, generally designated by the reference numeral 184 such as located within the first combustion chamber 116. For example, an adhesive-backed metal foil can be used for such an application.

The bulkhead 124 may also contain, include or have a second isolation disk, burst disk or the like, generally designated by the reference numeral 185, such as located within the second combustion chamber 118. Such a second isolation disk may be included to desirably provide pressure retention in the second combustion chamber until a designated pressure is reached or achieved within the second combustion chamber and at which pressure the isolation disk 185 bursts to allow flow of the second combustion chamber product gas into the first combustion chamber 116.

When activated, the first initiator 126 produces ignition products such as including hot gas that communicates via the igniter tube 130 with the interior of the first combustion chamber 116 such that at least a portion of the ignition products contact and ignite at least a portion of the quantity of the first gas generant 120 contained within the first combustion chamber 116. In turn, the ignition of the first gas generant 120 creates a supply of gas that passes through the openings 146 to the interior of the baffle 144. When the pressure within the first combustion chamber 116 is sufficiently elevated, the burst foil normally closing the exit opening 140 ruptures and allows the gas to exit the chamber 116 therethrough.

The gas subsequently passes into chamber 150 to impact the piston 156 and fill the mixing chamber 170. As the piston 156 advances into chamber 164, the gas produced can exit the inflator via openings 158.

As identified above, once one or more of the piston openings 172 have been moved/displaced into the chamber 164, past the O-ring seal 166, liquid 152 will begin to flow out of the chamber 164 through the openings 172 in the piston 156. The liquid 152 injected into the interior of the piston 156 contacts and mixes with the gas generant combustion product gas and can desirably vaporize and be used to inflate the airbag.

When properly actuated, the second initiator 136 can discharge or otherwise result in the ignition and reaction of the second gas generant 122 contained or housed within the second combustion chamber 118 and in the production of gaseous inflation products. With sufficient production of gaseous inflation products within the second combustion chamber 118, the pressure within the second combustion chamber 118 and acting against the burst disk 185 increases. When the pressure from within the second combustion chamber 118 against the burst disk 185 becomes sufficiently large, the burst disk 185 ruptures or otherwise allows the gas to exit the second combustion chamber 118 through the bulkhead gas flow openings 182. The rupture of the burst disk 185 allows pressure from the second combustion chamber 118 to act on the burst disk 184 and rupture or otherwise move the burst disk away from the openings 182.

Thus, as identified above, gas flow communication is permitted from the second combustion chamber 118 into the first combustion chamber 116. In particular, the gas products formed in the second combustion chamber 118 and passed into the first combustion chamber 116 can supplement the gas products formed in the first combustion chamber and can subsequently be appropriately contacted with injected liquid, as identified above, with the resulting gaseous products desirably passed through the gas exit flow openings 158 and out from the inflator assembly 110 into an associated airbag cushion (not shown).

The liquid 152 may be any liquid that remains a liquid between −40° C. and 90° C. In some embodiments, the liquid 152 can be any liquid that remains a liquid between −35° C. and 85° C. The liquid must also be capable of vaporizing endothermically and, when vaporized, produce a gas that is within acceptable effluent limits associated with airbags. Also, the liquid desirably is non-corrosive to facilitate storage in a simple chamber. Any liquid that will meet these criteria can be used as the liquid 152. An example of a liquid that meets such criteria includes water mixed with $CaCl_2$.

In one particular aspect of the invention, it has been found advantageous that the liquid 152 include at least one of a fuel soluble in the liquid or an oxidizer soluble in the liquid. When the liquid 152 is injected through the opening 172 and mixed with the gas generant combustion product gas, the at least one of a fuel or an oxidizer desirably decomposes, combusts and/or otherwise reacts to form additional gaseous products.

For example, in the case of an inflator containing a fuel-rich gas generant, it can be advantageous to include a soluble oxidizer in the liquid such that such oxidizer is available for reaction with residual fuel material such as to result in more complete reaction of available reactant and increased gas production. Correspondingly, in the event of an inflator containing a fuel-deficient gas generant, it can be advantageous to include a soluble fuel in the liquid such that such fuel is available for reaction with residual oxidizer material such as to result in more complete reaction of available reactant and increased gas production.

As will be appreciated by those skilled in the art and guided by the teachings herein provided, various soluble fuels and soluble oxidizers can be used in the practice of the invention. For example and dependent on the specifics of a particular application, suitable soluble fuels and soluble oxidizers such as for inclusion when the liquid comprises water include fuel materials such as urea, guanidine nitrate, alcohols including glycols such as propylene glycol and diethylene glycol, for example, glycerin, other sugars, glycine, chromates and dichromates such as sodium chromate, for example, and carbonates such as magnesium carbonate, for example, formamide, oxalic acid, and ammonium oxalate, for example as well as oxidizer materials such as ammonium nitrate, methylammonium nitrate, and ammonium perchlorate, for example.

Moreover, it is to be understood that suitable additive materials can in various embodiments serve multiple, additional or different functions. For example, in some embodiments, a suitable fuel can be or also desirably serve as a thickening agent or gelling agent. Examples of fuel materials that can serve as thickening or gelling agents include gums such as guar gum, xanthan gum or the like and cellulose such as hydroxypropyl cellulose (HPC) for example. Further, the inclusion of additives such as alcohols and sugars can desirably serve as freeze point depressants or anti-freeze materials. Similarly, carbonates and chromates, including dichromates, can also desirably serve as corrosion inhibitors or anti-corrosion materials, for example.

A liquid preferred for use in accordance with one embodiment of the invention is desirably composed of a mixture that suitably comprises, consist essentially of or consists of water, $CaCl_2$ and propylene glycol (1,2-propanediol). Those skilled in the art and guided by the teachings herein provided will appreciate that such mixtures can contain components such as $CaCl_2$ and propylene glycol in various relative amounts dependent on the particular requirements of a specific application. For example, while the inclusion of $CaCl_2$ can significantly reduce the freezing point of the mixture, the $CaCl_2$ will typically not react, e.g., is inert, and thus adds to the inflator residue and increases the burden for filtering the inflation gas. Also, while propylene glycol can serve as a fuel and thus through its inclusion serve to increase the gas output from the inflator without detrimentally adding to the inflator residue, various undesirable products of combustion may form if propylene glycol is included in the mixture in too high a relative amount. In view of the above, mixture of water with 10-20% $CaCl_2$ and 3-10% propylene glycol is desirable in some preferred embodiments, with a mixture of water with 15% $CaCl_2$ and 5% propylene glycol being particularly preferred for some embodiments.

Those skilled in the art and guided by the teachings herein provided with further appreciate, that in accordance with selected embodiments suitable liquids may include additional or alternative inert materials to $CaCl_2$. For example, a suitable liquid may include laponite, such as may serve as a thickener for the liquid.

In one preferred embodiment, the liquid 152 includes both at least one soluble fuel and at least one soluble oxidizer, with the at least one soluble fuel and the at least one soluble oxidizer reactable upon actuation to form additional gas. More specifically, when the liquid 152 is injected and mixed with the gas generant combustion product gas, the at least one soluble fuel and the at least one soluble oxidizer desirably decompose, combust and/or otherwise react such as to form additional gaseous products.

Those skilled in the art and guided by the teachings herein provided will appreciate that various advantageous and/or benefits are attainable or can be realized through such addition of fuel and/or oxidizer in the liquid. For example, through the increased or added gas product production resulting via such addition, the gas generant load required for an inflator to produce a particular gas output can be reduced and thus one or more of the cost, size and weight of gas generant and the associated inflator can be reduced. Further, such addition of fuel and/or oxidizer in the liquid can be accomplished via a very simple process. Still further, the addition of the soluble fuel and/or oxidizer can further serve to depress the freezing point of the liquid such as to reduce, minimize, or avoid the need to include any antifreeze material or additive in the liquid.

The invention in its broader application is not limited to the use of a particular or specific gas generant. As those skilled in the art will appreciate, the invention can be practiced using a wide variety of gas generant materials which meet flame temperature, stability, filterability, toxicity, corrosivity, and gas generation requirements.

As will be appreciated, gas generant materials, e.g., pyrotechnics, useful in the practice of the invention can take various appropriate desired forms, including, for example, various extruded forms including tableted and pressed geometries as well as granulated materials. The invention, in its broader practice, is not limited to particular or specific forms of gas generant materials.

Further, it is to be appreciated that while an inflator assembly in accordance with the invention may utilize a gas generant material of the same composition and physical form or parameters as both the first and second gas generant materials, the broader practice of the invention is not so limited. For example, it specifically may be desired that the first gas generant material be relatively slow burning so as to result in or provide a slower or gentler onset of inflation of the associated airbag cushion and that the second gas generant material be relatively quick burning to provide a quicker or faster inflation rate for the associated airbag and such as may be desired in the occurrence of the associated vehicle being involved in a relatively severe collision or crash. Such difference in performance can be realized through the use of gas generant materials of different composition as the first and second gas generant materials. Alternatively or additionally, the first and second gas generant materials can be in different physical form or have different physical parameters, e.g., shape and size. For example, to provide a faster or more rapid burning material it may be desirable to employ a form of the material having an increased or greater surface area.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A multi-stage inflator comprising:
   a housing at least in part defining a first combustion chamber containing a quantity of a first pyrotechnic material gas generant reactable to form a first product gas, the first combustion chamber having at least one exit opening to allow at least a portion of the first product gas to exit the first combustion chamber;
   a first initiator operatively associated with the first combustion chamber in reaction initiating communication with at least a portion of the quantity of the first pyrotechnic material gas generant, the first initiator, upon actuation, to ignite the first pyrotechnic material gas generant to form the first product gas;
   the housing additionally at least in part defining a second combustion chamber containing a quantity of a second gas pyrotechnic material generant reactable to form a second product gas, the second combustion chamber adjacently disposed the first combustion chamber, the second combustion chamber having at least one exit opening to allow at least a portion of the second product gas to exit from the second combustion chamber and into the first combustion chamber;
   a second initiator operatively associated with the second combustion chamber in reaction initiating communication with at least a portion of the quantity of the second pyrotechnic material gas generant, the second initiator, upon actuation, to ignite the second pyrotechnic material gas generant to form the second product gas; and
   the housing additionally having at least one discharge opening to permit gas to exit the housing,
   wherein the housing includes an end wall and wherein both the first and the second initiators are connected to the end wall.

2. The multi-stage inflator of claim 1 wherein the multi-stage inflator has an elongated form.

3. The multi-stage inflator of claim 1 wherein the first combustion chamber contains an elongated baffle disposed therewithin to permit gas from within the first combustion chamber to communicate with the at least one first chamber exit opening.

4. The multi-stage inflator of claim 1 wherein the first and second pyrotechnic material gas generant materials differ in one or more of the following aspects: composition, shape, and size.

5. The multi-stage inflator of claim 1 wherein the first pyrotechnic material gas generant and the second pyrotechnic material gas generant are compositionally the same.

6. A multi-stage inflator comprising:
   a housing at least in part defining a first combustion chamber containing a quantity of a first gas generant reactable to form a first product gas, the first combustion chamber having at least one exit opening to allow at least a portion of the first product gas to exit the first combustion chamber;
   a first initiator operatively associated with the first combustion chamber in reaction initiating communication with at least a portion of the quantity of the first gas generant, the first initiator, upon actuation, to ignite the first gas generant to form the first product gas;
   the housing additionally at least in part defining a second combustion chamber containing a quantity of a second gas generant reactable to form a second product gas, the second combustion chamber adjacently disposed the first combustion chamber, the second combustion chamber having at least one exit opening to allow at least a portion of the second product gas to exit from the second combustion chamber and into the first combustion chamber;
   a second initiator operatively associated with the second combustion chamber in reaction initiating communication with at least a portion of the quantity of the second gas generant, the second initiator, upon actuation, to ignite the second gas generant to form the second product gas;
   the housing additionally having at least one discharge opening to permit gas to exit the housing,
   wherein the housing includes an end wall and wherein both the first and the second initiators are connected to the end wall, and
   the housing additionally defines a storage chamber adjacently disposed the first combustion chamber opposite the second combustion chamber, the storage chamber containing a quantity of liquid and a piston assembly, the piston assembly including a piston having an interior sealed from the quantity of liquid, wherein during deployment, the piston moves to unseal the interior of the piston from the liquid to expel at least a portion of the quantity of liquid from the storage chamber such that the expelled liquid contacts and cools at least the first product gas.

7. The multi-stage inflator of claim 6 wherein the expelled liquid additionally contacts and cools at least a portion of the second product gas.

8. A tubular multi-stage inflator comprising:
   a tubular housing having an elongated form and at least in part defining a first combustion chamber containing a quantity of a first gas generant reactable to form a first product gas, the first combustion chamber having at least one exit opening to allow at least a portion of the first product gas to exit the first combustion chamber;
   a first initiator operatively associated with the first combustion chamber in reaction initiating communication with at least a portion of the quantity of the first gas generant, the first initiator, upon actuation, to ignite the first gas generant to form the first product gas;
   the tubular housing additionally at least in part defining a second combustion chamber containing a quantity of a second gas generant reactable to form a second product gas, the second combustion chamber adjacently disposed the first combustion chamber, the second combustion chamber having at least one exit opening to allow at least a portion of the second product gas to exit from the second combustion chamber and into the first combustion chamber;
   a second initiator operatively associated with the second combustion chamber in reaction initiating communication with at least a portion of the quantity of the second gas generant, the second initiator, upon actuation, to ignite the second gas generant to form the second product gas; and the tubular housing additionally having at least one discharge opening to permit gas to exit the housing,
wherein the inflator includes an end wall and wherein both the first and the second initiators are connected to the end wall.

9. The tubular multi-stage inflator of claim 8 wherein:
the housing additionally defines a storage chamber adjacently disposed the first combustion chamber, the storage chamber containing a quantity of liquid and a piston assembly, the piston assembly including a piston having an interior sealed from the quantity of liquid, wherein during deployment, the piston moves to unseal the interior of the piston from the liquid to expel at least a portion of the quantity of liquid from the storage chamber such that the expelled liquid contacts and cools at least the first product gas.

10. The tubular multi-stage inflator of claim 8 wherein the first gas generant and the second gas generant are each a pyrotechnic material.

11. The tubular multi-stage inflator of claim 10 wherein the first and second gas generant materials differ in one or more of the following aspects: composition, shape, and size.

12. The tubular multi-stage inflator of claim 10 wherein the first gas generant and the second gas generant are compositionally the same.

13. A method of operation for a multi-stage inflator that includes a tubular housing having an elongated form and at least in part defining a first combustion chamber containing a quantity of a first pyrotechnic material gas generant reactable to form a first product gas, the first combustion chamber having at least one exit opening to allow at least a portion of the first product gas to exit the first combustion chamber; the tubular housing additionally at least in part defining a second combustion chamber containing a quantity of a second pyrotechnic material gas generant reactable to form a second product gas, the second combustion chamber adjacently disposed the first combustion chamber, the second combustion chamber having at least one exit opening to allow at least a portion of the second product gas to exit from the second combustion chamber and into the first combustion chamber; a first initiator operatively associated with the first combustion chamber in reaction initiating communication with at least a portion of the quantity of the first pyrotechnic material gas generant, the first initiator, upon actuation, to ignite the first pyrotechnic material gas generant to form the first product gas; a second initiator operatively associated with the second combustion chamber in reaction initiating communication with at least a portion of the quantity of the second pyrotechnic material gas generant, the second initiator, upon actuation, to ignite the second pyrotechnic material gas generant to form the second product gas; and the tubular housing additionally having at least one discharge opening to permit gas to exit the housing, and the inflator also includes an end wall with both the first and the second initiators connected to the end wall, the method comprising:
actuating the first initiator to ignite the first pyrotechnic material gas generant material and to form the first product gas and
releasing at least a portion of the first product gas through the at least one discharge opening.

14. The method of claim 13 additionally comprising:
actuating the second initiator to ignite the second pyrotechnic material gas generant material and to form the second product gas and
releasing at least a portion of the second product gas through the at least one discharge opening.

15. The method of claim 14 wherein said actuation of the second initiator is at a preselected time interval subsequent to said actuation of the first initiator.

16. The multi-stage inflator of claim 1 wherein the housing is tubular and the tubular housing at least in part defines a portion of the first combustion chamber and a portion of the second combustion chamber.

17. The multi-stage inflator of claim 1 additionally comprising an igniter tube spanning the second combustion chamber between the first initiator and the first combustion chamber.

18. The multi-stage inflator of claim 1 wherein the first and second combustion chambers are disposed side-by-side and separated by a bulkhead element.

19. A multi-stage inflator comprising:
a housing at least in part defining a first combustion chamber containing a quantity of a first gas generant reactable to form a first product gas, the first combustion chamber having at least one exit opening to allow at least a portion of the first product gas to exit the first combustion chamber;
a first initiator operatively associated with the first combustion chamber in reaction initiating communication with at least a portion of the quantity of the first gas generant, the first initiator, upon actuation, to ignite the first gas generant to form the first product gas;
the housing additionally at least in part defining a second combustion chamber containing a quantity of a second gas generant reactable to form a second product gas, the second combustion chamber adjacently disposed the first combustion chamber, the second combustion chamber having at least one exit opening to allow at least a portion of the second product gas to exit from the second combustion chamber and into the first combustion chamber;
a second initiator operatively associated with the second combustion chamber in reaction initiating communication with at least a portion of the quantity of the second gas generant, the second initiator, upon actuation, to ignite the second gas generant to form the second product gas; and
the housing additionally having at least one discharge opening to permit gas to exit the housing,
wherein the housing includes an end wall, with both the first and the second initiators connected to the end wall and with an igniter tube spanning the second combustion chamber between the first initiator and the first combustion chamber.

\* \* \* \* \*